United States Patent
Wang et al.

(10) Patent No.: US 11,765,441 B1
(45) Date of Patent: Sep. 19, 2023

(54) AUDIO/VIDEO PLAYBACK DEVICE AND METHOD OF DISPLAYING AUDIO/VIDEO SIGNAL INFORMATION THEREOF

(71) Applicant: MediaTek Singapore Pte. Ltd., Singapore (SG)

(72) Inventors: Zhicheng Wang, Hefei Anhui (CN); Chao Yan, Hefei Anhui (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/816,755

(22) Filed: Aug. 2, 2022

(30) Foreign Application Priority Data

May 27, 2022 (TW) .................................. 111119857

(51) Int. Cl.
  *H04N 21/84* (2011.01)
  *H04N 21/488* (2011.01)
  *H04N 21/485* (2011.01)
  *H04N 21/439* (2011.01)
  *H04N 21/44* (2011.01)

(52) U.S. Cl.
  CPC ......... *H04N 21/84* (2013.01); *H04N 21/4394* (2013.01); *H04N 21/44008* (2013.01); *H04N 21/485* (2013.01); *H04N 21/4884* (2013.01)

(58) Field of Classification Search
  None
  See application file for complete search history.

(56) References Cited

U.S. PATENT DOCUMENTS

| | | | |
|---|---|---|---|
| 10,979,495 B2* | 4/2021 | Yamagishi | H04L 67/1031 |
| 2017/0374429 A1* | 12/2017 | Yang | H04N 7/08 |
| 2018/0048408 A1* | 2/2018 | Deshpande | H04H 20/95 |
| 2018/0152256 A1* | 5/2018 | Deshpande | H04N 21/84 |
| 2018/0213266 A1* | 7/2018 | Kwak | H04N 21/236 |
| 2018/0262552 A1* | 9/2018 | Park | H01F 27/2828 |
| 2020/0244725 A1* | 7/2020 | Yamagishi | H04M 3/00 |
| 2021/0185388 A1* | 6/2021 | Clift | H04N 21/4345 |
| 2021/0288735 A1* | 9/2021 | Yamagishi | H04N 21/26258 |

OTHER PUBLICATIONS

Chinese language office action dated Nov. 4, 2022, issued in application No. TW 111119857.

* cited by examiner

*Primary Examiner* — James R Marandi
(74) *Attorney, Agent, or Firm* — McClure, Qualey & Rodack, LLP (57) ABSTRACT

An audio/video playback device is provided, which includes a communication interface and a processor. The communication interface is configured to receive a digital broadcast signal. The processor is configured to obtain SLS (Service Layer Signaling) from a broadcast stream of the digital broadcast signal, wherein the SLS includes a first field and a second field. The processor compares first metadata in the first field and second metadata in the second field, and includes one or more identifiers which correspond to each other in the first metadata and the second metadata into a first list. The processor displays a candidate menu on the audio/video playback device according to the first list.

19 Claims, 7 Drawing Sheets

AUDIO/VIDEO PLAYBACK DEVICE AND METHOD OF DISPLAYING AUDIO/VIDEO SIGNAL INFORMATION THEREOF

CROSS REFERENCE TO RELATED APPLICATIONS

This application claims the benefits of Taiwan Application No. 111119857 filed on May 27, 2022, the entirety of which is incorporated by reference herein.

BACKGROUND OF THE INVENTION

Field of the Invention

The present invention relates to audio/video processing, and, in particular, to an audio/video playback device and a method for displaying audio/video signal information thereof.

Description of the Related Art

The Advance Television System Committee (ATSC) 3.0 standard has become the next-generation television standard and can transmit digital broadcast signals based on IP communication networks. However, although audio/video signals of the digital broadcast signal conforming to the ATSC 3.0 standard can have various video signals, audio signals, and subtitle signals, the information contained in the media description often does not match the actual video signals, audio signals, and subtitle signals when the digital broadcast signal is generated by the playback end. In addition, the user of a conventional audio/video playback device is likely to mistakenly select a video signal, audio signal, or subtitle signal that is not actually included in the audio/video signal, resulting in a poor user experience while viewing audio/video content.

BRIEF SUMMARY OF THE INVENTION

An embodiment of the present invention provides an audio/video playback device that includes a communication interface and a processor. The communication interface is configured to receive a digital broadcast signal. The processor is configured to obtain SLS (Service Layer Signaling) from a broadcast stream of the digital broadcast signal, wherein the SLS comprises a first field and a second field. The processor compares first metadata in the first field and second metadata in the second field, and includes one or more identifiers which correspond to each other in the first metadata and the second metadata into a first list. The processor displays a candidate menu on the audio/video playback device according to the first list.

In some embodiments, the first field stores S-TSID (Service-based Transport Session Instance Description) metadata, and the second field stores MPD (Media Presentation Description) metadata.

In some embodiments, the first field stores one or more first video identifiers, one or more first audio identifiers, and one or more first subtitle identifiers corresponding to one or more video signals, one or more audio signals, and one or more subtitle signals, respectively. The second field stores one or more second video identifiers, one or more second audio identifiers, and one or more second subtitle identifiers respectively corresponding to the video signals, the audio signals, and the subtitle signals.

In some embodiments, when the first video identifier corresponds to the second video identifier, the one or more identifiers in the first list comprise one or more video identifiers corresponding to each other in the first field and the second field. When the first audio identifier corresponds to the second audio identifier, the one or more identifiers in the first list comprise one or more audio identifiers corresponding to each other in the first field and the second field. When the first subtitle identifier corresponds to the second subtitle identifier, the one or more identifiers in the first list comprise one or more subtitle identifiers corresponding to each other in the first field and the second field.

In some embodiments, in response to an external menu-reading request signal, the processor reads the first list to display a candidate menu on a display panel of the audio/video playback device, and the candidate menu comprises one or more video options, one or more audio options, and one or more subtitle options corresponding to the one or more video identifiers, the one or more audio identifiers, and the one or more subtitle identifiers, respectively.

In some embodiments, the processor extracts the video signal, the audio signal, and the subtitle signal from the broadcast stream of the digital broadcast signal according to the video option, the audio option, and the subtitle option on the candidate menu selected by a user, and plays the extracted video signal, the extracted audio signal, and the extracted subtitle signal on the audio/video playback device.

In some embodiments, the processor includes the one or more video identifiers, the one or more audio identifiers, and the one or more subtitle identifiers that do not correspond to each other in the first field and the second field into a second list.

Another embodiment of the present invention provides a method for displaying audio/video signal information. The method includes the following steps: obtaining a digital broadcast signal via a communication interface; obtaining SLS (Service Layer Signaling) from a broadcast stream of the digital broadcast signal, wherein the SLS comprises a first field and a second field; comparing first metadata in the first field and second metadata in the second field, and including one or more identifiers which correspond to each other in the first metadata and the second metadata into a first list; and displaying a candidate menu on the audio/video playback device according to the first list.

In some embodiments, the first field stores S-TSID metadata, and the second field stores MPD metadata.

In some embodiments, the first field stores one or more first video identifiers, one or more first audio identifiers, and one or more first subtitle identifiers respectively corresponding to one or more video signals, one or more audio signals, and one or more subtitle signals. The second field stores one or more second video identifiers, one or more second audio identifiers, and one or more second subtitle identifiers respectively corresponding to the video signals, the audio signals, and the subtitle signals.

In some embodiments, when the first video identifier corresponds to the second video identifier, the one or more identifiers in the first list comprise one or more video identifiers corresponding to each other in the first field and the second field. When the first audio identifier corresponds to the second audio identifier, the one or more identifiers in the first list comprise one or more audio identifiers corresponding to each other in the first field and the second field. When the first subtitle identifier corresponds to the second subtitle identifier, the one or more identifiers in the first list comprise one or more subtitle identifiers corresponding to each other in the first field and the second field.

In some embodiments, the method further comprises the following step: in response to an external menu-reading request signal, reading the first list to display a candidate menu on a display panel of the audio/video playback device, wherein the candidate menu comprises one or more video options, one or more audio options, and one or more subtitle options corresponding to the one or more video identifiers, the one or more audio identifiers, and the one or more subtitle identifiers, respectively.

In some embodiments, the method further comprises the following steps: extracting the video signal, the audio signal, and the subtitle signal from the broadcast stream of the digital broadcast signal according to the video option, the audio option, and the subtitle option on the candidate menu selected by a user; and playing the extracted video signal, the extracted audio signal, and the extracted subtitle signal on the audio/video playback device.

In some embodiments, the method further comprises the following step: including the one or more video identifiers, the one or more audio identifiers, and the one or more subtitle identifiers that do not correspond to each other in the first field and the second field into a second list.

Yet another embodiment of the present invention provides an audio/video playback device is provided, which includes a communication interface and a processor. The communication interface is configured to receive a digital broadcast signal. The processor is configured to obtain SLS (Service Layer Signaling) from a broadcast stream of the digital broadcast signal, wherein the SLS comprises a first field, a second field, and a third field. The processor determines whether specific component description information in the third field has a corresponding specific component in the first field and the second field. In response to the specific component description information in the third field having the corresponding specific component in the first field and the second field, the processor includes the specific component and the specific component description information into a first list, and displays a candidate menu on the audio/video playback device according to the first list.

In some embodiments, the first field stores S-TSID metadata, and the second field stores MPD metadata, and the third field stores USBD (User Service Bundle Description) metadata.

In some embodiments, in response to the specific component description information in the third field having no corresponding specific component in the first field and the second field, the processor does not include the specific component description information into the first list.

In some embodiments, the processor further compares first metadata in the first field and second metadata in the second field, and includes one or more identifiers which correspond to each other in the first metadata and the second metadata into the first list.

Yet another embodiment of the present invention provides a method for displaying audio/video signal information. The method includes the following steps: obtaining a digital broadcast signal via a communication interface; obtaining SLS (Service Layer Signaling) from a broadcast stream of the digital broadcast signal, wherein the SLS comprises a first field, a second field, and a third field; determining whether specific component description information in the third field has a corresponding specific component in the first field and the second field; and in response to the specific component description information in the third field having the corresponding specific component in the first field and the second field, including the specific component and the specific component description information into a first list, and displaying a candidate menu on the audio/video playback device according to the first list.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
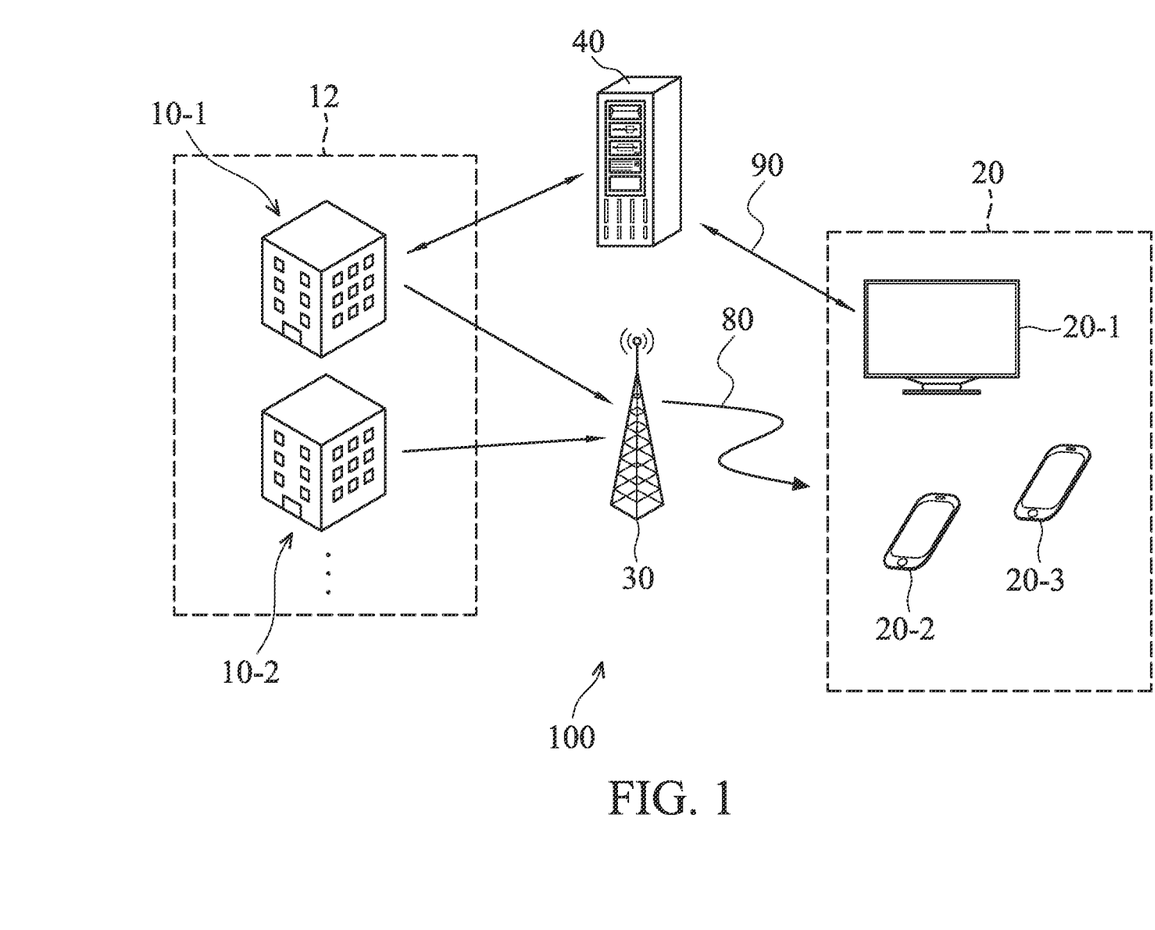
FIG. 1 is a diagram of the audio/video broadcast system in accordance with an embodiment of the disclosure.

FIG. 1 is a diagram of the audio/video broadcast system in accordance with an embodiment of the disclosure.

The audio/video broadcast system 100, for example, may support the ATSC 3.0 standard, and the ATSC 3.0 standard supports IP (Internet Protocol) transmissions.

As depicted in FIG. 1, in the audio/video broadcast system 100, one or more transmitter devices may be disposed in each broadcaster 12, such as transmitter devices 10-1 and 10-2 (which are collectively regarded as a transmitter device 10). The transmitter device 10 may use a broadcast stream including TV programs and other contents as a digital broadcast signal for transmission.

The transmitter device 10 may transmit the digital broadcast signal to the receiver device 20 with the aid of the radio-wave tower 30 through the transmission path 80 (e.g., a wireless broadcast link), such as a fixed receiver device 20-1 (e.g., a TV set), or mobile receiver devices 20-2 and 20-3 (e.g., smartphones, tablet PCs, laptop computers, etc.). In addition, the transmitter device 10 can also transmit the digital broadcast signal to the receiver device 20 through the server via the transmission path 90 (e.g., a broadband link). The receiver device 20 can be, for example, a TV or a mobile device that supports the ATSC 3.0 standard, which can process the broadcast stream in the received digital broadcast signal, and then play the video, sound, and subtitles of the content of the TV program. In some embodiments, the receiver device 20 may also be referred to as an audio/video playback device.

The aforementioned broadcast stream may include, for example, two functional components: a bootstrap signaling through a service list table (SLT), and a service layer signaling (SLS). These two functional components represent the information necessary to discover and obtain ATSC 3.0 services. For example, the SLT enables the addressed device to build a basic service list and to direct SLS for each ATSC 3.0 service discovered. The SLS enables the receiver devices to discover and access ATSC 3.0 services and their content components.

Figure 2A:
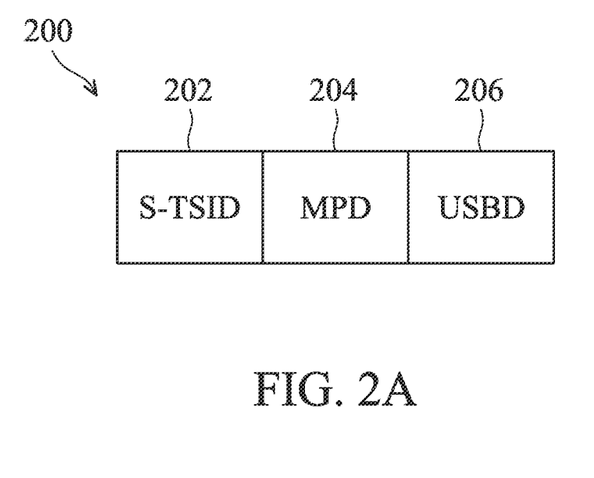
FIGS. 2A-2C are diagrams of the service layer signaling in accordance with an embodiment of the present disclosure.
Figures 2B, 2C:
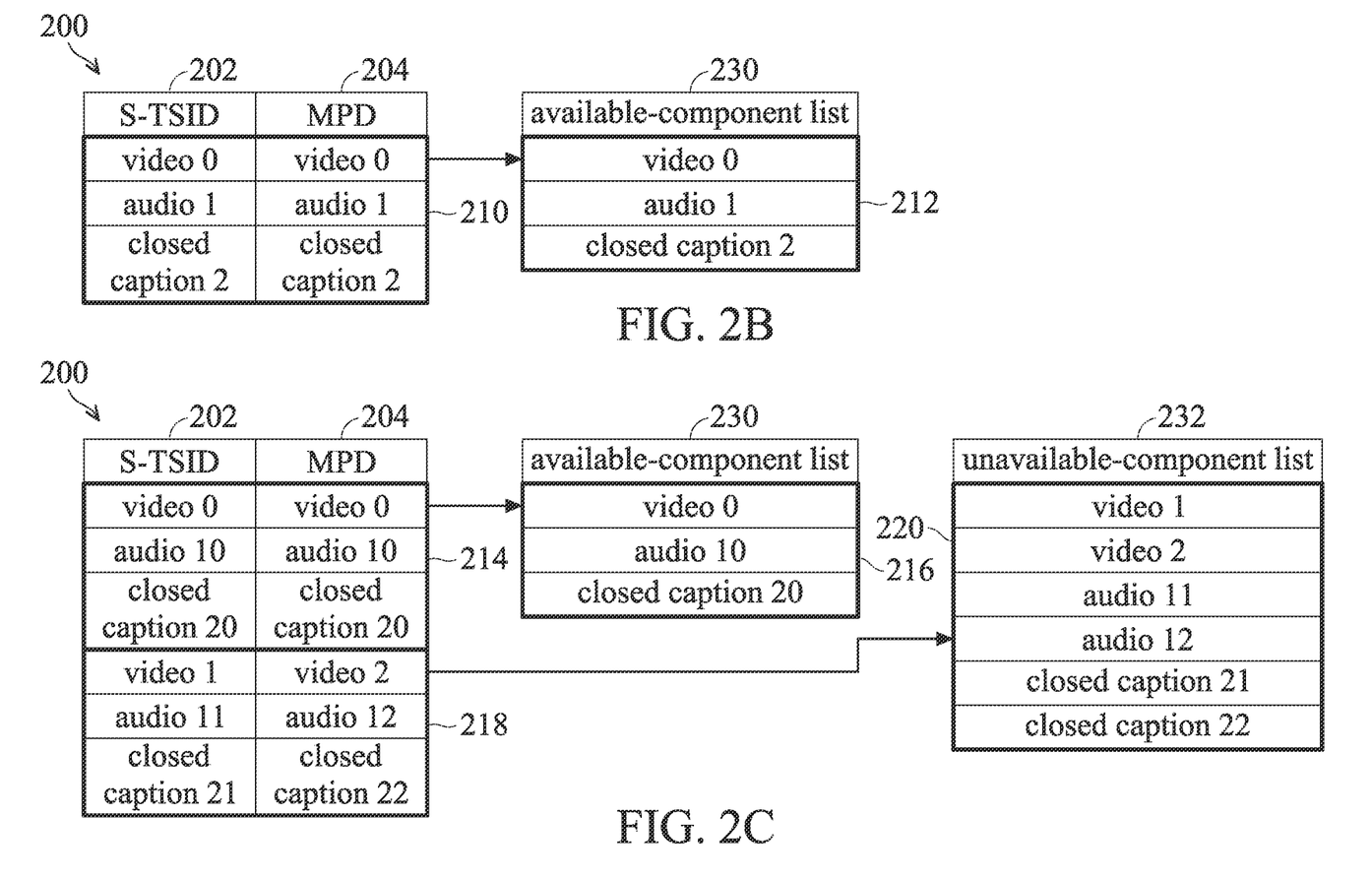

FIGS. 2A-2C are diagrams of the service layer signaling in accordance with an embodiment of the present disclosure.

In an embodiment, the SLS 200 may include fields 202, 204, and 206, which store various metadata. For example, according to the ATSC 3.0 standard, field 202 may be the Service-based Transport Session Instance Description (S-TSID) metadata, and field 204 may be the Media Presentation Description (MPD) metadata, and field 206 may be User Service Bundle Description (USBD) metadata or User Service Description (USD) metadata, as shown in FIG. 2A.

Field 202 (e.g., the first field) may include the position or acquisition path of the video signal, audio signal, and subtitle signal carried in the broadcast stream, and may include corresponding video identifiers, audio identifiers, and subtitle identifiers (e.g., it can be regarded as the address of the video signal, audio signal, and subtitle signal). Field 204 (e.g., the second field) may include relevant information of the video signal, audio signal, and subtitle signal that can be played in the broadcast stream, such as format and playback timing. In other words, the video identifier, audio identifier, and subtitle identifier in field 202 can be recognized by the receiver device 20. In addition, the same video signal in the broadcast stream of the digital broadcast signal may correspond to one or more audio signals (e.g., multi-national audio tracks) and one or more subtitles (e.g., multi-national subtitles). In addition, field 206 may include information about the video signal, audio signal, and subtitle signal currently in the broadcast stream of the digital broadcast signal, such as attributes of the video signal and audio signal presented to the user (e.g., voice of the country).

For example, as shown in FIG. 2B, field 202 may include components of video 0, audio 1, and closed caption (CC) 2, where video 0 represents video identifier=0, and audio 1 represents audio identifier=1, and closed caption 2 represents subtitle identifier=2, and so on.

In addition, field 204 in FIG. 2B may also include components of video 0, audio 1 and closed caption 2. Accordingly, under normal circumstances, when the user wants to inquire (e.g., via the remote control) the video, audio, and subtitle options supported by the currently viewed audio/video signal, the receiver device 20 can usually read the metadata in field 206, and displays information in field 206 on the query screen menu (e.g., a candidate menu). The user can also select the video, audio, or subtitle options in the screen menu. The receiver device 20 may extract the corresponding video signal, audio signal, and subtitle signal from the broadcast stream of the digital broadcast signal for displaying according to the video, audio, and subtitle options selected by the user.

Specifically, the receiver device 20 can compare the metadata stored in fields 202 and 204 of the SLS 200 (e.g., including video identifiers, audio identifiers, and subtitle identifiers), and determine whether the metadata stored in fields 202 and 204 correspond. In the embodiment of FIG. 2B, the MPD metadata (e.g., including video 0, audio 1, and closed caption 2) in field 204 exactly correspond to the S-TSID metadata (e.g., including video 0, audio 1, and closed caption 2) in field 202, which means that the video identifiers, audio identifiers, and subtitle identifiers in fields 202 and 204 correspond to each other, and no missing or additional video identifiers, audio identifiers, and subtitle identifiers in fields 202 and 204.

Referring to FIG. 2C, field 202 of the SLS 200 may include components of video 0, audio 10, closed caption 20, video 1, audio 11, and closed caption 21, and field 204 may include components of video 0, audio 10, closed caption 20, video 2, audio 12, and closed caption 22. The receiver device 20 can also compare the metadata stored in fields 202 and 204, and determine whether the metadata stored in fields 202 and 204 correspond to each other.

When the transmitter device 10 generates the digital broadcast signal, an error may occur, which means that some components in the metadata of fields 202 and 204 do not correspond to each other. For example, in the embodiment, the receiver device 20 may determine that the components of metadata stored in fields 202 and 204 do not completely correspond, and it may further determine which component in the metadata stored in fields 202 and 204 correspond to each other or does not correspond to each other. For example, the components of the metadata in block 214 of fields 202 and 204 corresponds to each other, which include video 0, audio 10, and closed caption 20. Meanwhile, the receiver device 20 may include the mutually corresponding components into an available-component list 230 (e.g., a first list), which means the identifiers (e.g., video 0, audio 10, and closed caption 20) of the mutually corresponding components in block 210 are included into block 212 of the available-component list 230. In other words, the available-component list 230 may represent the corresponding video identifiers, audio identifiers, and subtitle identifiers of the video signal, audio signal, and subtitle signal that are actually available and playable in the digital broadcast signal. In other words, although field 206 records the information of the video signal and audio signal currently in the broadcast stream, the video, audio, and subtitle options that are actually available and playable in the digital broadcast signal can be filtered out through the aforementioned method, and the video, audio, and subtitle options that are not playable will not be presented on the screen menu for selecting by the user.

In addition, the components of the metadata in fields 202 and 204 do not completely correspond to each other. For example, the components of video 2, audio 12, and closed caption 22 in the metadata of field 204 have no corresponding components in the metadata of field 202. Similarly, the components of video 1, audio 11, and closed caption 21 in the metadata of field 202 have no corresponding components in the metadata of field 204. At this time, the receiver device 20 may include the components that are not mutually corresponding into an unavailable-component 232 (e.g., a second list), which means the identifiers of the components (e.g., video 1, audio 11, closed caption 21, video 2, audio 12, and closed caption 22) that do not correspond to each other in block 218 are included into block 220 of the unavailable-component list 232.

Therefore, in the abnormal condition that the metadata of fields 202 and 204 of the SLS 200 are not completely corresponding, when the user wants to inquire (e.g., sending an external menu-reading request signal through the remote control) the video, audio, and subtitle options supported by the currently viewed audio/video signal, the receiver device 20 may obtain the metadata stored in the available-component list 230, and display the information about the obtained metadata on the query screen menu (e.g., a candidate menu). It should be noted that, in the embodiment, the receiver device 20 does not consider the USBD/USD information in field 206.

Accordingly, the user can select the video, audio, or subtitle options in the screen menu, and the receiver device 20 will extract the corresponding video signal, audio signal, and subtitle signal from the broadcast stream of the digital broadcast signal according to the video, audio, and subtitle options selected by the user. Thus, When the user uses the remote control to select video, audio, or subtitle options, the user will not see unplayable video, audio, or subtitle options on the screen menu, thereby ensuring the user experience while viewing the audio/video signal.

Figure 2D:
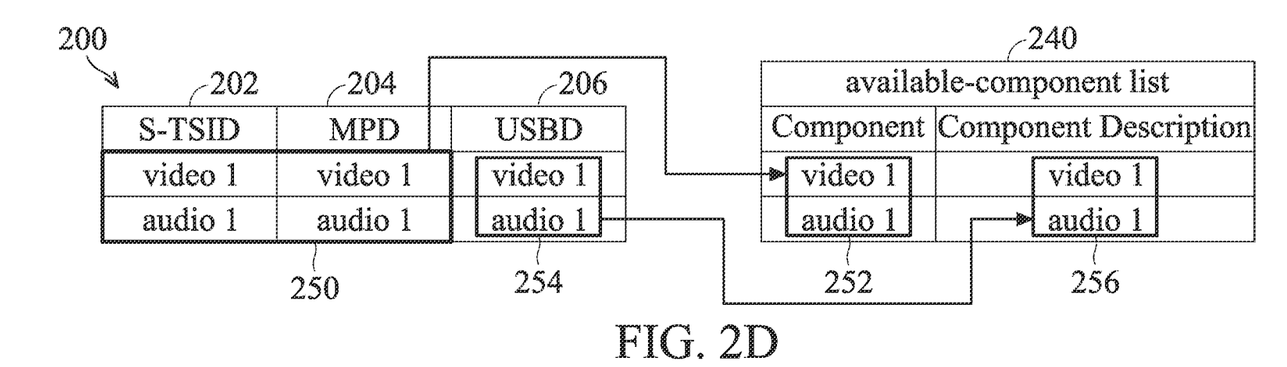
FIGS. 2D-2E are diagrams of the service layer signaling in accordance with another embodiment of the present disclosure.
Figure 2E:
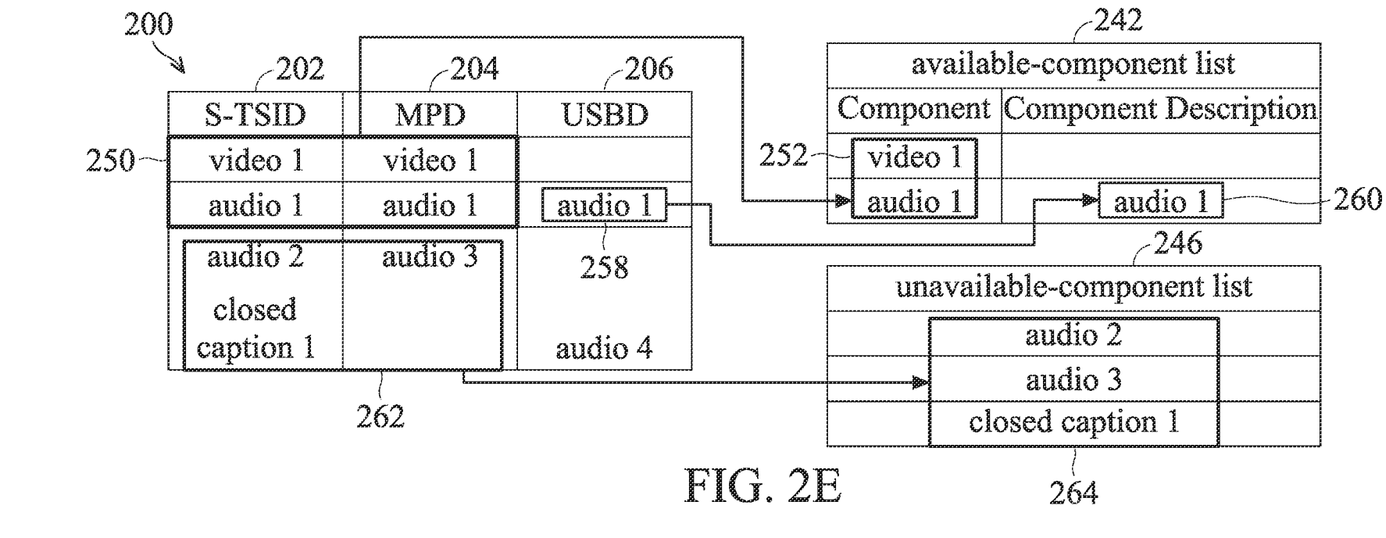

FIGS. 2D-2E are diagrams of the service layer signaling in accordance with another embodiment of the present disclosure. Please refer to FIG. 2A, and FIGS. 2D-2E.

In another embodiment, the SLS 200 may also include fields 202, 204, and 206, which correspond to S-TSID, MPD, and USBD/USD metadata, respectively. In addition, when the receiver device 20 displays a screen menu (e.g., a candidate menu) according to the user's command, the receiver device 20 may first refer to the USBD/USD metadata stored in field 206, and compare the USBD/USD metadata with the S-TSID metadata and MPD metadata stored in fields 202 and 204 to generate an available-component list 240.

For example, in a first scenario, the metadata stored in fields 202 and 204 of the SLS 200 both include components of video 1 and audio 1, and the metadata stored in field 206 also includes component description of video 1 and audio 1, as shown in FIG. 2D. When the user wants to inquiry (e.g., via the remote control) different video, audio, and subtitle options supported by the currently viewed audio/video signal, the receiver device 20 may first read the component-description information in field 206, and then check whether each of the component-description information in field 206 has a corresponding component in fields 202 and 204.

For example, the component description information of "video 1" in field 206 has a corresponding component of "video 1" in fields 202 and 204, and the component description information "audio 1" in field 206 has a corresponding component "audio 1" in fields 202 and 204. Accordingly, the receiver device 20 may include the aforementioned corresponding components and component description information into the available-component list 240, which means that the identifiers (e.g., video 1 and audio 1) of the corresponding components in block 250 are included into block 252 of the available-component list 240, and the component description information in block 254 (e.g., the component description information "video 1" and "audio 1") is included into block 256 of the available-component list 240.

In the second scenario, a portion of the component description information recorded in field 206 has no corresponding components in fields 202 and 204. For example, as shown in FIG. 2E, the metadata stored in field 202 of the SLS 200 may include components of video 1, audio 1, audio 2, and closed caption 1, and the metadata stored in field 204 may include components of video 1, audio 1, and audio 3, and the metadata stored in field 206 may include component description of audio 1 and audio 4.

When the user wants to inquiry (e.g., via the remote control) different video, audio, and subtitle options supported by the currently viewed audio/video signal, the conventional receiver device will display the information (i.e., USBD or USD) in field 206 on the query screen menu (e.g., a candidate menu). In traditional technical solutions, the screen menu (e.g., candidate menu) displayed by the conventional receiver device will include options of audio 1 and audio 4. However, in fact, the component description of audio 4 does not correspond to any component in S-TSID and MPD, so when the user uses the remote control to select the screen menu of the conventional receiver device, he or she may select the option of component audio 4 which is not playable.

In the embodiment, the receiver device 20 of the disclosure may first read the component description information in field 206, and check whether each of the component description information in field 206 has a corresponding component in fields 202 and 204. For example, the receiver device 20 may first check whether the component description information of "audio 1" has a corresponding component in fields 202 and 204. As shown in FIG. 2E, the component description information of "audio 1" in field 206 corresponds to the component of audio 1 in both fields 202 and 204. In addition, the receiver device 20 may still check whether fields 202 and 204 have corresponding components (e.g., video identifiers, audio identifiers, and subtitle identifiers) using the method described in the aforementioned embodiments. In the embodiment of FIG. 2E, the components of video 1 and audio 1 in fields 202 and 204 correspond to each other, so the receiver device 20 will include the identifiers (e.g., video 1 and audio 1) of the corresponding components in block 250 into block 252 of the available-component list 242. In addition, the receiver device 20 may also include the component description information of "audio 1" in block 258 into block 260 of the available-component list 242.

In the embodiment of FIG. 2E, field 202 further includes components of audio 2 and closed caption 1, but these components have no corresponding components in field 204. In addition, field 204 further includes the component of audio 3, but this component has no corresponding component in field 202. Accordingly, the receiver device 20 may include the identifiers (e.g., audio 2, closed caption 1, and audio 3) of the non-corresponding components in block 262 into block 264 of the unavailable-component list 246.

It should be noted that field 206 further includes the component description information of "audio 4". The receiver device 20 will also check whether the component description information of "audio 4" in field 206 has a corresponding component in fields 202 and 204. Since the component description information of "audio 4" in field 206 has no corresponding component of "audio 4" in fields 202 and 204, the receiver device 20 will determine that the component description information of "audio 4" in field 206 is invalid information. Thus, the receiver device 20 will not include the component description information of "audio 4" into the available-component list, and therefore the component description information of "audio 4" will not be displayed on the screen menu for selection by the user. In other words, although the receiver device 20 reads the component description information (e.g., USBD/USD information) in field 206, the receiver device 20 will only include the actually playable components and the corresponding component description information (if any) into the available-component list. Finally, the receiver device 20 may display the screen menu (e.g., a candidate menu) according to the available-component list.

Figure 3:
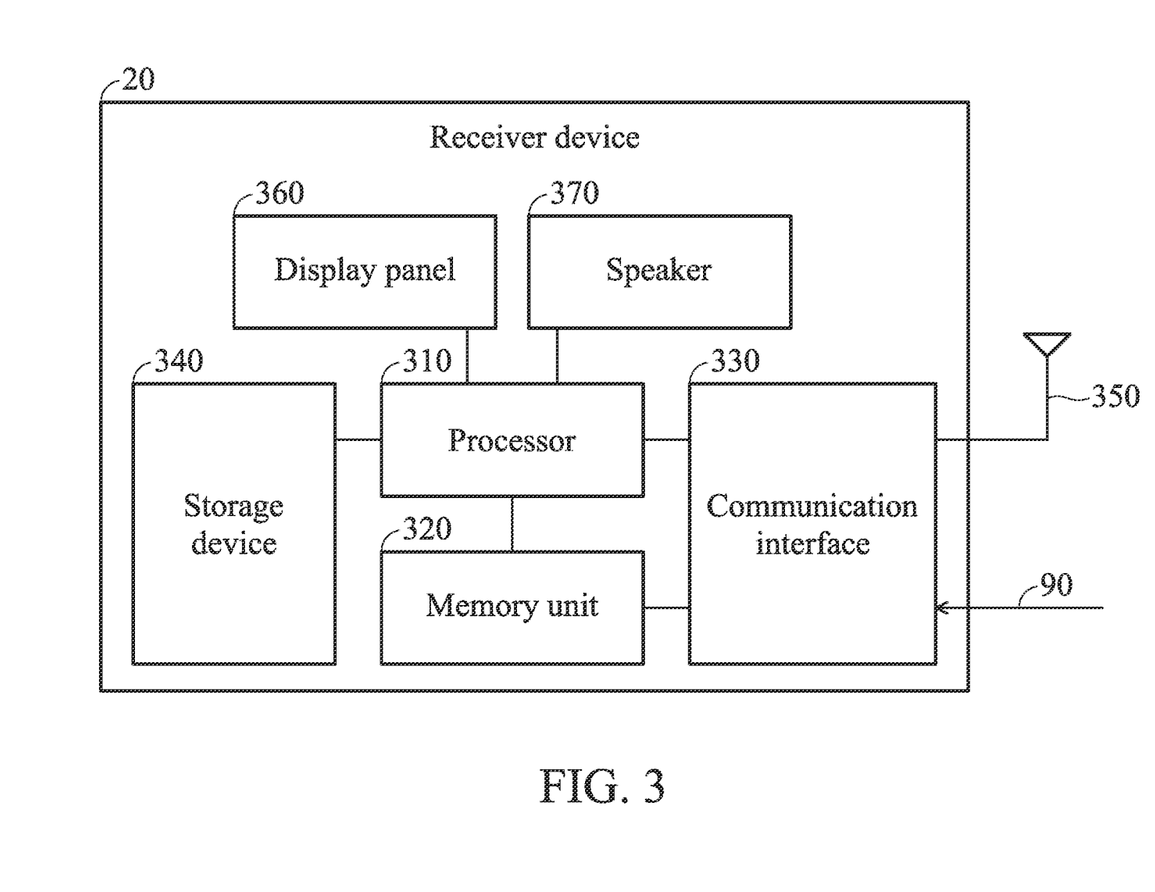
FIG. 3 is a block diagram of a receiver device in accordance with an embodiment of the disclosure.

FIG. 3 is a block diagram of a receiver device in accordance with an embodiment of the disclosure. Please refer to FIG. 1 to FIG. 3.

In an embodiment, the receiver device 20 shown in FIG. 3 is used to perform the relevant operations described in the embodiment of FIG. 2. The receiver device 20 may include a processor 310, a memory unit 320, a communication interface 330, a storage device 340, an antenna 350, a display panel 360, and a speaker 370. The processor 310 may be, for example, a central processing unit (CPU), a general-purpose processor, an application-specific integrated circuit (ASIC), a reduced-instruction-set computer (RISC), and/or a field-programmable gate array (FPGA), but the disclose is not limited thereto.

The memory unit 320 may be a random access memory, such as a dynamic random access memory or a static random access memory, but the disclosure is not limited thereto. The memory unit 320 may be used as a system memory or an image buffer.

The storage device 340 may be a non-volatile memory, such as a hard disk drive (HDD), a solid-state disk (SSD), a flash memory, or a read-only memory, but the disclosure is not limited thereto. The storage device 340 can store, for example, the code or micro-instruction code required for the receiver device 20 to operate and perform video and audio decoding, and can include an operating system and/or firmware.

The communication interface 330 may include a wired-network interface and a wireless-network interface, wherein the wired-network interface may receive the digital broadcast signal from the transmission path 90, and the wireless-network interface can receive the digital broadcast signal from the transmission path 80 through the antenna 350, but the disclose is not limited thereto.

The display panel 360 may be, for example, a liquid-crystal display (LCD) panel, an light-emitting diode (LED) panel, an organic light-emitting diode (OLED) panel, an E-Ink display module, etc., but the disclosure is not limited thereto.

In an embodiment, the processor 310 may extract the corresponding video signal, audio signal, and subtitle signal from the digital broadcast signal for video decoding and audio decoding according to the video, audio, and subtitle options selected by the user, and perform corresponding video processing, audio processing, and image overlaying of subtitles to generate an output video signal and an output audio signal. The processor 310 may then play the output video signal and output audio signal (e.g., can be collectively referred to as an output audio/video signal) on the display panel 360 and the speaker 370, respectively.

In some embodiments, the receiver device 20 may further include an infrared receiver (not shown), which can receive an infrared command (e.g., an external menu-reading request signal). For example, the user can operate the remote control to play the audio/video signal, such as forward, backward, fast forward, and so on. In addition, the user may also operate the remote control to select video, audio, and subtitle options in the screen menu of corresponding to the video signal, and the processor 310 may extract the corresponding video signal, audio signal, and subtitle signal from the broadcast stream of the digital broadcast signal according to the video, audio, and subtitle options selected by the user.

Figure 4:
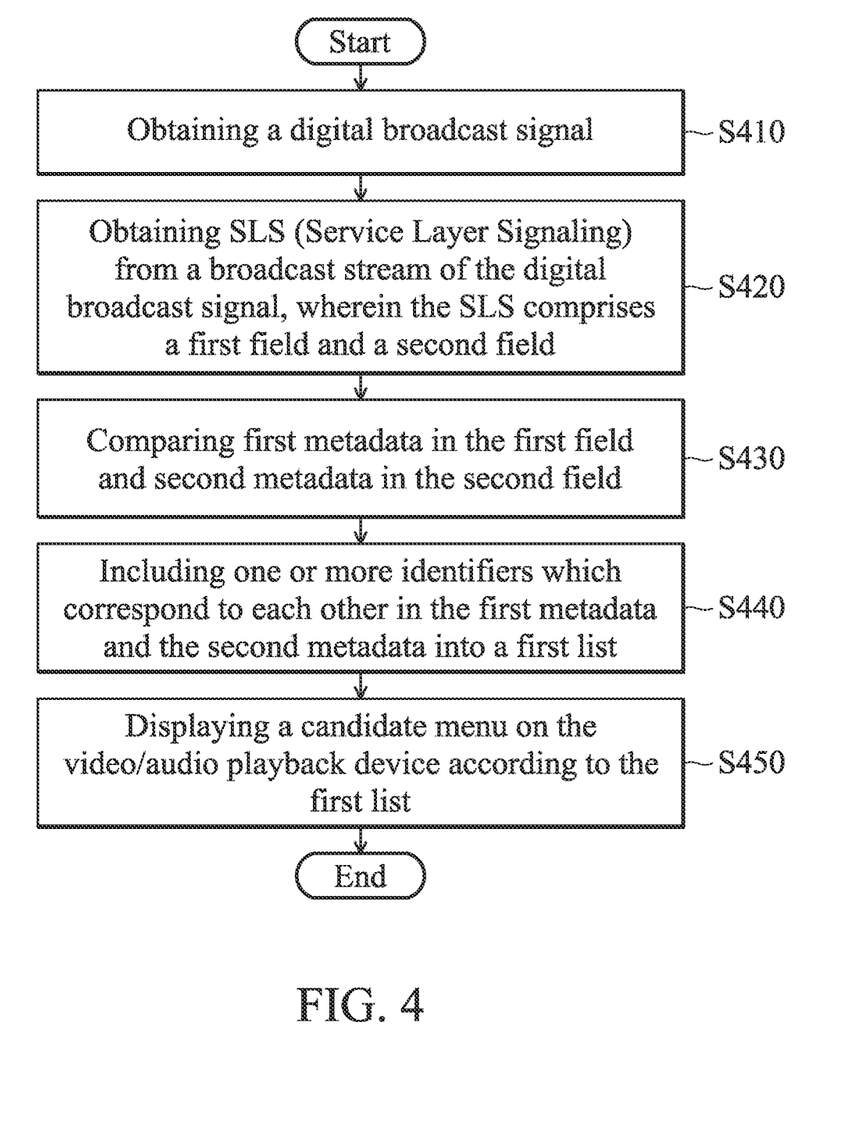
FIG. 4 is a flow diagram of a method for displaying audio/video signal information in accordance with an embodiment of the present disclosure'

FIG. 4 is a flow diagram of a method for displaying audio/video signal information in accordance with an embodiment of the present disclosure. Please refer to FIG. 1, FIGS. 2A-2C, FIG. 3, and FIG. 4.

In step S410, the audio/video playback device (e.g., the receiver device 20) receives a digital broadcast signal. For example, the transmitter device 10 may transmit the digital broadcast signal to the receiver device 20 with the aid of the radio-wave tower 30 through the transmission path 80 (e.g., a wireless broadcast link). In addition, the transmitter device 10 can also transmit the digital broadcast signal to the receiver device 20 through the server via the transmission path 90 (e.g., a broadband link).

In step S420, the audio/video playback device obtains SLS (Service Layer Signaling) of a broadcast stream of the digital broadcast signal, wherein the SLS includes a first field and a second field. For example, as shown in FIG. 2A, the SLS 200 may include fields 202, 204, and 206. Field 202 may be the Service-based Transport Session Instance Description (S-TSID) metadata, and field 204 may be the Media Presentation Description (MPD) metadata, and field 206 may be User Service Bundle Description (USBD) metadata or User Service Description (USD) metadata. The first field and the second field may correspond to fields 202 and 204, respectively.

In step S430, comparing first metadata in the first field and second metadata in the second field. For example, field 202 (e.g., the first field) may include video identifiers, audio identifiers, and subtitle identifiers respectively corresponding to the video signal, audio signal, and subtitle signal in the broadcast stream of the digital broadcast signal. Field 204 (e.g., the second field) may include relevant information of the video signal, audio signal, and subtitle signal that can be played in the broadcast stream. Each of the video signals, audio signal, and subtitle signals has a corresponding identifier for recognition by the receiver device 20. The processor 310 of the receiver device 20 can compare the first metadata in the first field and the second metadata in the second field to find the video identifiers, audio identifiers, and subtitle identifiers that correspond to each other, and to find the video identifiers, audio identifiers, and subtitle identifiers that do not correspond to each other.

In step S440, one or more corresponding identifiers in the first metadata and the second metadata are included into a first list. For example, as shown in FIG. 2C, the components of the metadata in block 214 of fields 202 and 204 corresponds to each other, and they includes the components of video 0, audio 10, and closed caption 20. At this time, the receiver device 20 may include the corresponding components in block 214 into the available-component list 230 (e.g., the first list), which means that the identifiers of the corresponding components in block 214 are included into block 214 of the available-component list 230. In addition, the components of the metadata in block 218 of fields 202 and 204 do not correspond to each other. For example, the components of video 2, audio 12, and closed caption 22 in the metadata of field 204 have no corresponding components in the metadata of field 202. Similarly, the components of video 1, audio 11, and closed caption 21 in the metadata of field 202 have no corresponding components in the metadata of field 204. At this time, the receiver device 20 may include the components that are not mutually corresponding into an unavailable-component 232 (e.g., the second list), which means the identifiers of the components (e.g., video 1, audio 11, closed caption 21, video 2, audio 12, and closed caption 22) that do not correspond to each other in block 218 are include into block 220 of the unavailable-component list 232.

In step S450, a candidate menu is displayed according to the first list. For example, the first list is the available-component list, which indicates that the video identifiers, audio identifiers, and subtitle identifiers corresponding to the video signal, audio signal, and subtitle signal are actually available and playable in the broadcast stream of the digital broadcast signal. Thus, the video, audio, and subtitle options on the candidate menu displayed by the processor 310 of the receiver device 20 according to the first list ensures that the video signal, audio signal, and subtitle signal are available for viewing by the user. Therefore, when the user uses the remote control to perform selection operations on the video, audio, and subtitle options, the user will not view any unplayable video, audio, and subtitle options on the screen menu, thereby improving the user experience while viewing the audio/video signal by the user.

Figure 5:
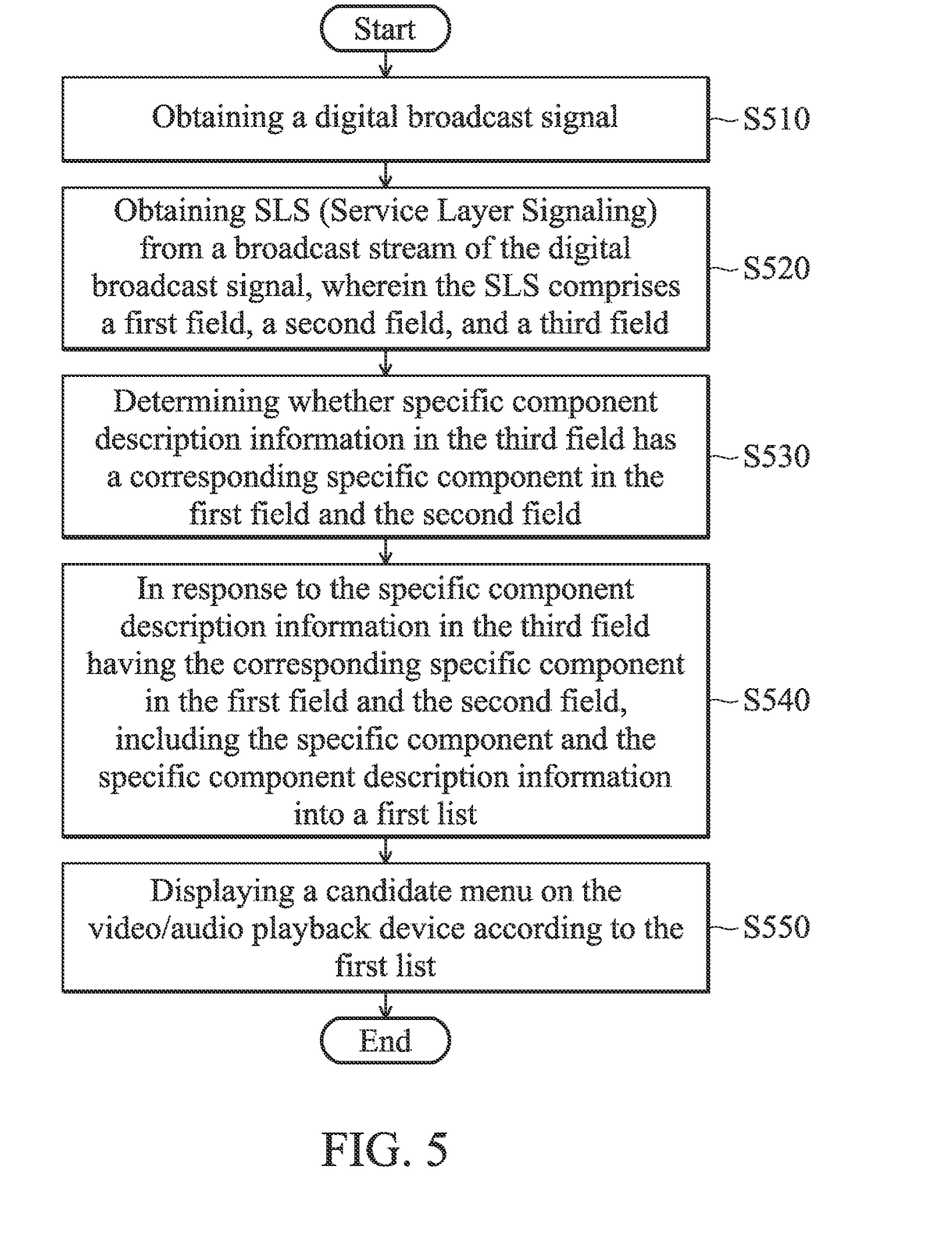
FIG. 5 is a flow diagram of a method for displaying audio/video signal information in accordance with another embodiment of the present disclosure.

FIG. 5 is a flow diagram of a method for displaying audio/video signal information in accordance with another embodiment of the present disclosure. Please refer to FIG. 1, FIGS. 2D-2E, and FIG. 5.

In step S510, the audio/video playback device (e.g., the receiver device 20) receives a digital broadcast signal. For example, the transmitter device 10 may transmit the digital broadcast signal to the receiver device 20 through the radio-wave tower 30 through the transmission path 80 (e.g., a wireless broadcast link). In addition, the transmitter device 10 can also transmit the digital broadcast signal to the receiver device 20 through the server via the transmission path 90 (e.g., a broadband link).

In step S520, the audio/video playback device obtains SLS (Service Layer Signaling) of a broadcast stream of the digital broadcast signal, wherein the SLS includes a first field, a second field, and third field. For example, as shown in FIG. 2A, the SLS 200 may include fields 202, 204, and 206. Field 202 may be the Service-based Transport Session Instance Description (S-TSID) metadata, and field 204 may be the Media Presentation Description (MPD) metadata, and field 206 may be User Service Bundle Description (USBD) metadata or User Service Description (USD) metadata. The first field, second field, and third field may correspond to fields 202, 204, and 206, respectively.

In step S530, it is determined whether specific component description information in the third field has a corresponding specific component in the first field and the second field. For example, when the receiver device 20 displays a screen menu (e.g., a candidate menu) according to the user's command, the receiver device 20 may first refer to the USBD/USD metadata stored in field 206, and compare the USBD/USD metadata with the S-TSID metadata and MPD metadata stored in fields 202 and 204 to generate an available-component list 240, as shown in FIG. 2D and FIG. 2E. When the user wants to inquiry (e.g., via the remote control) different video, audio, and subtitle options supported by the currently viewed audio/video signal, the receiver device 20 may first read the component-description information in field 206, and then check whether each of the component-description information in field 206 has a corresponding component in fields 202 and 204.

In step S540, in response to the specific component description information in the third field having the corresponding specific component in the first field and the second field, the specific component and the specific component description information are included into a first list. For example, in the embodiment of FIG. 2E, the components of video 1 and audio 1 in fields 202 and 204 correspond to each other, so the receiver device 20 will include the identifiers (e.g., video 1 and audio 1) of the corresponding components in block 250 into block 252 of the available-component list 242. In addition, the receiver device 20 may also include the component description information of "audio 1" in block 258 into block 260 of the available-component list 242.

In step S550, a candidate menu is displayed according to the first list. For example, the first list is the available-component list, which indicates that the video identifiers, audio identifiers, and subtitle identifiers corresponding to the video signal, audio signal, and subtitle signal are actually available and playable in the broadcast stream of the digital broadcast signal. In the embodiment, although the receiver device 20 first read the component description information (e.g., USBD/USD metadata) in field 206, the receiver device 20 may still obtain the first list using the aforementioned procedure. Thus, the video, audio, and subtitle options on the candidate menu displayed by the processor 310 of the receiver device 20 according to the first list ensures that the video signal, audio signal, and subtitle signal are available for viewing by the user. Therefore, when the user uses the remote control to perform selection operations on the video, audio, and subtitle options on the receiver device 20, the user will not view any unplayable video, audio, and subtitle options on the screen menu, thereby improving the user experience while viewing the audio/video signal by the user.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio/video playback device, comprising:
a communication interface, configured to receive a digital broadcast signal; and
a processor, configured to obtain SLS (Service Layer Signaling) from a broadcast stream of the digital broadcast signal, wherein the SLS comprises a first field and a second field,
wherein the processor compares first metadata in the first field and second metadata in the second field, and includes one or more identifiers which correspond to each other in the first metadata and the second metadata into a first list,
wherein the processor displays a candidate menu on the audio/video playback device according to the first list.

2. The audio/video playback device as claimed in claim 1, wherein the first field stores S-TSID (Service-based Transport Session Instance Description) metadata, and the second field stores MPD (Media Presentation Description) metadata.

3. The audio/video playback device as claimed in claim 2, wherein the first field stores one or more first video identifiers, one or more first audio identifiers, and one or more first subtitle identifiers respectively corresponding to one or more video signals, one or more audio signals, and one or more subtitle signals,
wherein the second field stores one or more second video identifiers, one or more second audio identifiers, and one or more second subtitle identifiers respectively corresponding to the one or more video signals, the one or more audio signal, and the one or more subtitle signals.

4. The audio/video playback device as claimed in claim 3, wherein when the first video identifier corresponds to the second video identifier, the one or more identifiers in the first list comprise one or more video identifiers corresponding to each other in the first field and the second field;
wherein when the first audio identifier corresponds to the second audio identifier, the one or more identifiers in the first list comprise one or more audio identifiers corresponding to each other in the first field and the second field; and
wherein when the first subtitle identifier corresponds to the second subtitle identifier, the one or more identifiers in the first list comprise one or more subtitle identifiers corresponding to each other in the first field and the second field.

5. The audio/video playback device as claimed in claim 4, wherein in response to an external menu-reading request signal, the processor reads the first list to display a candidate menu on a display panel of the audio/video playback device, and the candidate menu comprises one or more video options, one or more audio options, and one or more subtitle options respectively corresponding to the one or more video identifiers, the one or more audio identifiers, and the one or more subtitle identifiers.

6. The audio/video playback device as claimed in claim 5, wherein the processor extracts the video signal, the audio signal, and the subtitle signal from the broadcast stream of the digital broadcast signal according to the video option, the audio option, and the subtitle option on the candidate menu selected by a user, and plays the extracted video signal, the extracted audio signal, and the extracted subtitle signal on the audio/video playback device.

7. The audio/video playback device as claimed in claim 4, wherein the processor includes the one or more video identifiers, the one or more audio identifiers, and the one or more subtitle identifiers that do not correspond to each other in the first field and the second field into a second list.

8. A method for displaying audio/video signal information, comprising:
obtaining a digital broadcast signal via a communication interface;
obtaining SLS (Service Layer Signaling) from a broadcast stream of the digital broadcast signal, wherein the SLS comprises a first field and a second field;
comparing first metadata in the first field and second metadata in the second field, and including one or more identifiers which correspond to each other in the first metadata and the second metadata into a first list; and
displaying a candidate menu on the audio/video playback device according to the first list.

9. The method as claimed in claim 8, wherein the first field stores S-TSID (Service-based Transport Session Instance Description) metadata, and the second field stores MPD (Media Presentation Description) metadata.

10. The method as claimed in claim 9, wherein the first field stores one or more first video identifiers, one or more first audio identifiers, and one or more first subtitle identifiers respectively corresponding to one or more video signals, one or more audio signals, and one or more subtitle signals,
wherein the second field stores one or more second video identifiers, one or more second audio identifiers, and one or more second subtitle identifiers respectively corresponding to the one or more video signals, the one or more audio signal, and the one or more subtitle signals.

11. The method as claimed in claim 10, wherein when the first video identifier corresponds to the second video identifier, the one or more identifiers in the first list comprise one or more video identifiers corresponding to each other in the first field and the second field;
wherein when the first audio identifier corresponds to the second audio identifier, the one or more identifiers in the first list comprise one or more audio identifiers corresponding to each other in the first field and the second field; and
wherein when the first subtitle identifier corresponds to the second subtitle identifier, the one or more identifiers in the first list comprise one or more subtitle identifiers corresponding to each other in the first field and the second field.

12. The method as claimed in claim 11, further comprising:
in response to an external menu-reading request signal, reading the first list to display a candidate menu on a display panel of the audio/video playback device,
wherein the candidate menu comprises one or more video options, one or more audio options, and one or more subtitle options corresponding to the one or more video identifiers, the one or more audio identifiers, and the one or more subtitle identifiers, respectively.

13. The method as claimed in claim 12, further comprising:
extracting the video signal, the audio signal, and the subtitle signal from the broadcast stream of the digital broadcast signal according to the video option, the audio option, and the subtitle option on the candidate menu selected by a user; and
playing the extracted video signal, the extracted audio signal, and the extracted subtitle signal on the audio/video playback device.

14. The method as claimed in claim 11, further comprising:
including the one or more video identifiers, the one or more audio identifiers, and the one or more subtitle identifiers that do not correspond to each other in the first field and the second field into a second list.

15. An audio/video playback device, comprising:
a communication interface, configured to receive a digital broadcast signal; and
a processor, configured to obtain SLS (Service Layer Signaling) from a broadcast stream of the digital broadcast signal, wherein the SLS comprises a first field, a second field, and a third field,
wherein the processor determines whether specific component description information in the third field has a corresponding specific component in the first field and the second field,
wherein in response to the specific component description information in the third field having the corresponding specific component in the first field and the second field, the processor includes the specific component and the specific component description information into a first list, and displays a candidate menu on the audio/video playback device according to the first list.

16. The audio/video playback device as claimed in claim 15, wherein the first field stores S-TSID (Service-based Transport Session Instance Description) metadata, and the second field stores MPD (Media Presentation Description)

metadata, and the third field stores USBD (User Service Bundle Description) metadata.

17. The audio/video playback device as claimed in claim 15, wherein in response to the specific component description information in the third field having no corresponding specific component in the first field or the second field, the processor does not include the specific component description information into the first list.

18. The audio/video playback device as claimed in claim 15, wherein the processor further compares first metadata in the first field and second metadata in the second field, and includes one or more identifiers which correspond to each other in the first metadata and the second metadata into the first list.

19. A method for displaying audio/video signal information, comprising:
- obtaining a digital broadcast signal via a communication interface;
- obtaining SLS (Service Layer Signaling) from a broadcast stream of the digital broadcast signal, wherein the SLS comprises a first field, a second field, and a third field;
- determining whether specific component description information in the third field has a corresponding specific component in the first field and the second field; and
- in response to the specific component description information in the third field having the corresponding specific component in the first field and the second field, including the specific component and the specific component description information into a first list, and displaying a candidate menu on the audio/video playback device according to the first list.

* * * * *